United States Patent
Ur

(10) Patent No.: US 10,192,359 B2
(45) Date of Patent: *Jan. 29, 2019

(54) SUBJECT SELECTED AUGMENTED REALITY SKIN

(71) Applicant: EMPIRE TECHNOLOGY DEVELOPMENT LLC, Wilmington, DE (US)

(72) Inventor: Shmuel Ur, Galil (IL)

(73) Assignee: EMPIRE TECHNOLOGY DEVELOPMENT, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,887

(22) PCT Filed: Jan. 31, 2014

(86) PCT No.: PCT/US2014/014212
§ 371 (c)(1),
(2) Date: Sep. 12, 2014

(87) PCT Pub. No.: WO2015/116183
PCT Pub. Date: Aug. 6, 2015

(65) Prior Publication Data
US 2016/0240005 A1    Aug. 18, 2016

(51) Int. Cl.
*G06T 19/00*    (2011.01)
*G06Q 30/02*    (2012.01)
(Continued)

(52) U.S. Cl.
CPC .......... *G06T 19/006* (2013.01); *G06F 3/1454* (2013.01); *G06K 9/00268* (2013.01); *G06Q 30/02* (2013.01)

(58) Field of Classification Search
CPC .................................................... G06T 19/006
(Continued)

(56) References Cited

U.S. PATENT DOCUMENTS 5,278,662 A * 1/1994 Womach ............... G11B 15/00
                                                        348/722
6,672,961 B1    1/2004 Uzun
(Continued)

FOREIGN PATENT DOCUMENTS

EP    1453002 A2    9/2004
GB    2488237 A     8/2012
(Continued)

OTHER PUBLICATIONS

"ARToolKit," accessed at https://web.archive.org/web/20131230032715/http://www.hitl.washington.edu/artoolkit/, accessed on Aug. 5, 2014, p. 1.
(Continued)

*Primary Examiner* — Javid A Amini

(57) ABSTRACT

Technologies are generally described for systems, devices and methods effective to generate augmented image data. In some examples, a first device may receive first data from a second device. The first data may include data related to an image associated with the first device, such as an image of a user using the first device. The first device may apply an augmented reality skin to the first data to generate second data. The second data may relate to an augmented image associated with the first device. The first device may send the second data to the second device. The second device may then display the second data.

17 Claims, 6 Drawing Sheets

(51) Int. Cl.
*G06F 3/14* (2006.01)
*G06K 9/00* (2006.01)

(58) Field of Classification Search
USPC .......................................................... 345/633
See application file for complete search history.

(56) References Cited

U.S. PATENT DOCUMENTS

| | | | |
|---|---|---|---|
| 7,626,569 B2* | 12/2009 | Lanier | G06F 1/1601 345/156 |
| 8,190,939 B2 | 5/2012 | Fields, Jr. et al. | |
| 8,743,145 B1* | 6/2014 | Price | G06T 19/006 345/629 |
| 9,380,270 B1* | 6/2016 | Worley, III | A61B 1/041 |
| 9,865,088 B2* | 1/2018 | Ur | G06T 19/006 |
| 2004/0179037 A1 | 9/2004 | Blattner et al. | |
| 2005/0026685 A1 | 2/2005 | Ruark et al. | |
| 2005/0175101 A1 | 8/2005 | Honda et al. | |
| 2005/0286799 A1 | 12/2005 | Huang et al. | |
| 2007/0038944 A1 | 2/2007 | Carignano et al. | |
| 2007/0260984 A1 | 11/2007 | Marks et al. | |
| 2009/0220170 A1* | 9/2009 | Liu | G06K 9/00221 382/276 |
| 2010/0302143 A1 | 12/2010 | Spivack | |
| 2011/0018903 A1* | 1/2011 | Lapstun | G02B 26/06 345/633 |
| 2011/0055049 A1 | 3/2011 | Harper et al. | |
| 2011/0134108 A1 | 6/2011 | Hertenstein | |
| 2011/0138416 A1 | 6/2011 | Kang et al. | |
| 2011/0141254 A1 | 6/2011 | Roebke et al. | |
| 2011/0216089 A1* | 9/2011 | Leung | G06T 7/0034 345/633 |
| 2011/0221659 A1* | 9/2011 | King, III | G02B 27/017 345/8 |
| 2011/0258175 A1* | 10/2011 | Kim | G06F 17/30864 707/709 |
| 2011/0279446 A1 | 11/2011 | Castro | |
| 2011/0283223 A1 | 11/2011 | Vaittinen | |
| 2012/0001939 A1 | 1/2012 | Sandberg | |
| 2012/0019547 A1* | 1/2012 | Tjen | G06T 19/006 345/589 |
| 2012/0092370 A1 | 4/2012 | Oh et al. | |
| 2012/0122529 A1 | 5/2012 | Lyons | |
| 2012/0240077 A1 | 9/2012 | Vaitiinen et al. | |
| 2012/0249741 A1* | 10/2012 | Maciocci | G06F 3/011 348/46 |
| 2012/0262485 A1 | 10/2012 | Raghoebardajal et al. | |
| 2012/0327196 A1* | 12/2012 | Ohba | G06K 9/00281 348/49 |
| 2013/0016123 A1* | 1/2013 | Skarulis | G09G 5/00 345/633 |
| 2013/0038633 A1 | 2/2013 | Maggiore | |
| 2013/0044129 A1* | 2/2013 | Latta | G09G 5/00 345/633 |
| 2013/0049976 A1 | 2/2013 | Maggiore | |
| 2013/0057544 A1 | 3/2013 | Oh | |
| 2013/0063487 A1 | 3/2013 | Spiegel et al. | |
| 2013/0093790 A1 | 4/2013 | Jin | |
| 2013/0106867 A1 | 5/2013 | Joo et al. | |
| 2013/0106900 A1 | 5/2013 | Joo et al. | |
| 2013/0128022 A1 | 5/2013 | Bose et al. | |
| 2013/0147837 A1* | 6/2013 | Stroila | G06T 19/006 345/633 |
| 2013/0293584 A1* | 11/2013 | Anderson | G06T 11/00 345/633 |
| 2014/0015987 A1 | 1/2014 | Harple et al. | |
| 2014/0173508 A1 | 6/2014 | Berry et al. | |
| 2014/0306982 A1 | 10/2014 | Ollivier | |
| 2015/0084989 A1 | 3/2015 | Laughlin | |
| 2015/0097812 A1 | 4/2015 | Huang | |
| 2015/0097862 A1 | 4/2015 | Reisner-Kollmann | |
| 2015/0123966 A1* | 5/2015 | Newman | G06T 19/006 345/419 |
| 2016/0062456 A1* | 3/2016 | Wang | G06F 21/32 382/117 |
| 2016/0063671 A1 | 3/2016 | Piippo | |

FOREIGN PATENT DOCUMENTS

| | | |
|---|---|---|
| JP | 2007216000 A | 8/2007 |
| KR | 20120070985 A | 7/2012 |
| WO | 2010024486 A1 | 3/2010 |
| WO | 2011146776 A1 | 11/2011 |
| WO | 2013023705 A1 | 2/2013 |
| WO | 2013049248 A2 | 4/2013 |

OTHER PUBLICATIONS

"Creator Program," accessed at https://web.archive.org/web/20130525200037/http://www.imvu.com/creators/about_the_program.php, accessed on Aug. 5, 2014, pp. 1-2.

"Glass Platform Developer Guidelines," accessed at https://web.archive.org/web/20131109171046/https://developers.google.com/glass/guidelines, Last modified Aug. 12, 2013, pp. 1-2.

"Inventory From Second Life Wiki," accessed at https://web.archive.org/web/20130907075454/http://wiki.secondlife.com/wiki/Inventory, Mar. 19, 2012, pp. 1-4.

Kokkevis, V., "GPU Accelerated Compositing in Chrome," Accessed at http://web.archive.org/web/20131210233722/http://www.chromium.org/developers/design-documents/gpu-accelerated-compositing-in-chrome, Accessed at Aug. 5, 2014, pp. 9.

"Pipeline (software)," Wikipedia, accessed at http://web.archive.org/web/20130123092009/http://en.wikipedia.org/wiki/Pipeline_(software), last modified on Jan. 3, 2013, pp. 1-5.

"Second Life Market Place," accessed at https://web.archive.org/web/20131104081053/https://marketplace.secondlife.com/products/search?search%5Bcategory_id%5D=33, Accessed on Aug. 5, 2013, pp. 1-10.

Carmigniani, J. and Furht, B. "Augmented Reality: An Overview," Handbook of Augmented Reality, 2011, pp. 3-46, Springer Science + Business Media.

Cobzas, D., et al., "Editing Real World Scenes: Augmented Reality with Image-based Rendering," In Proceedings of IEEE, 2003, pp. 291-292.

Columbus, L., "Gartner's Mobile App Store Forecast Predicts $26B in Sales, 102B Downloads in 2013," posted on Sep. 21, 2013, Accessed at http://www.forbes.com/sites/louiscolumbus/2013/09/21/gartners-mobile-app-store-forecast-predicts-26b-in-sales-102b-downloads-in-2013/?utm_campaign=techtwittersf&utm_source=twitter&utm_medium=social, Accessed on Aug. 5, 2014, pp. 6.

Gimeno, J. "An Advanced Authoring Tool for Augmented Reality Applications in Industry," In proceeding of: Actas de las XXII Jornadas de Paralelismo, Sep. 21, 2012, pp. 6.

Huang, C., et al., "Directions for Peer-to-Peer based mobile pervasive augmented reality gaming," International Conference on Parallel and Distributed Systems, 2007, pp. 1-8, vol. 2.

Inger, Y., "Real-time Image Blending for Augmented Reality on Mobile Phones," Jun. 2, 2011, pp. 1-16.

International Search Report and Written Opinion for International Application No. PCT/US2014/014201, dated Jun. 26, 2014, 10 pages.

International Search Report and Written Opinion for International Application No. PCT/US2014/014207, dated Jun. 25, 2014, 11 pages.

International search report and Written Opinion for international application No. Pct/US2014/014212, dated Jun. 23, 2014, 9 pages.

International Search Report and Written Opinion for International Application No. PCT/US2014/014223, dated Jun. 26, 2014, 10 pages.

Law, A., "Photoshop Quick Tip: Finding Layers Quickly," accessed at https://web.archive.org/web/20131007002057/http://www.gomediazine.com/tutorials/photoshop-quick-tip-finding-layers-quickly/, Gomedia, Jul. 27, 2009, pp. 1-4.

(56) References Cited

OTHER PUBLICATIONS

Leetaru, K. H., "ShadowLight: an immersive environment for rapid prototyping and design," Proceedings of the SPIE, 2005, pp. 606-615, vol. 5664.

Lepetit, V., et al., "Real-Time Augmented Face," In Proc. International Symposium on Mixed and Augmented Reality, 2003, pp. 1-2.

Patterson, S., "Photoshop Layers Essential Power Shortcuts," accessed at https://web.archive.org/web/20131118090620/http://www.photoshopessentials.com/basics/layer-shortcuts/, accessed on Aug. 5, 2014, pp. 1-12.

Philg, "Legal and social issues due to Google Glass?," accessed at https://web.archive.org/web/20140615133037/http://blogs.law.harvard.edu/philg/2013/05/31/legal-and-social-issues-due-to-google-glass/, May 31, 2013, pp. 1-4.

Renukdas, P. et al., "Markerless Augmented Reality Android App for Interior Decoration," International Journal of Engineering Research & Technology (IJERT), 2013, pp. 1367-1373, vol. 2 Issue 4.

Rosten, E., et al., "Real-time Video Annotations for Augmented Reality," Advances in Visual Computing, Lecture Notes in Computer Science, 2005, pp. 294-302, vol. 3804.

Stankovic, S. and Rakkolainen, I., "Augmented Reality," SGN-5406 Virtual Reality, 2012, pp. 1-71.

Tennant, D., "How Augmented Reality Will Help Close the Skills Gap," accessed at http://web.archive.org/web/20130613042449/http://www.itbusinessedge.com/blogs/from-under-the-rug/how-augmented-reality-will-help-close-the-skills-gap.html, IT Business Edge, Jan. 9, 2013, pp. 1-8.

Wiltzuis, T., "Accelerated Rendering in Chrome," accessed at https://web.archive.org/web/20131129024711/http://www.html5rocks.com/en/tutorials/speed/layers, Mar. 11, 2013, pp. 1-9.

Extended European Search Report for European Patent Application No. 14880509 dated Sep. 22, 2017, pp. 9.

Extended European Search Report for European Patent Application No. 14880818 dated Aug. 28, 2017, pp. 6.

Extended European Search Report for European Patent Application No. 14881088 dated Jun. 6, 2017, pp. 10.

Extended European Search Report for European Patent Application No. 14881231 dated May 26, 2017, pp. 9.

Shapira, L., et al., "Layout Design for Augmented Reality Applications," Microsoft, accessed at https://www.microsoft.com/en-us/research/publication/layout-design-for-augmented-reality-applications/, Jan. 1, 2014, pp. 3.

* cited by examiner

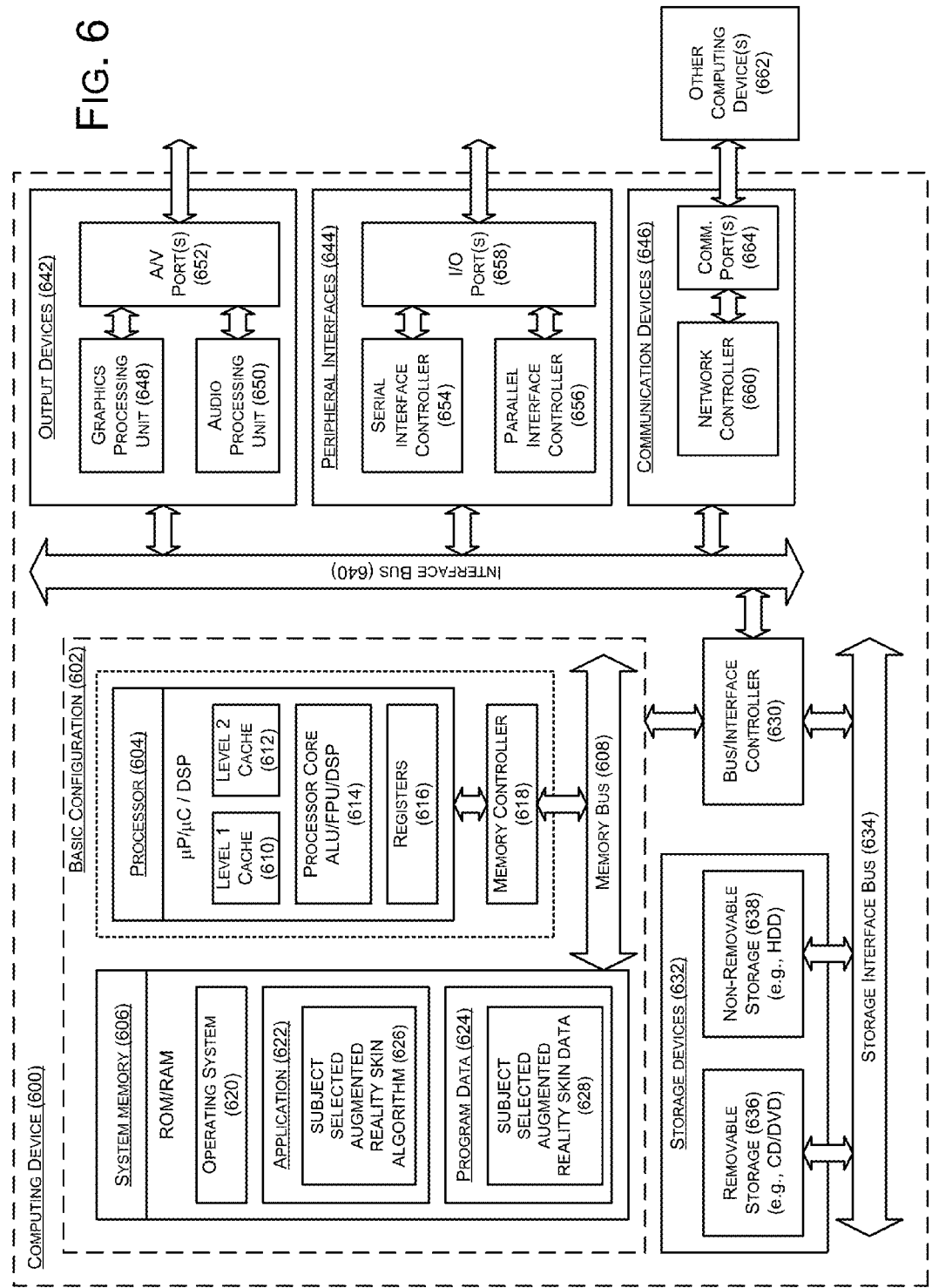

SUBJECT SELECTED AUGMENTED REALITY SKIN

CROSS-REFERENCE TO RELATED APPLICATIONS

This application is a U.S. National Stage filing under 35 U.S.C. § 371 of International Application No. PCT/US14/14212, filed on Jan. 31, 2014, the entirety of which is hereby incorporated by reference. This application is related to U.S. patent application Ser. No. 14/384,825 entitled "Augmented Reality Skin Manager", U.S. patent application Ser. No. 14/384,870 entitled "Augmented Reality Skin Evaluation", and U.S. patent application Ser. No. 14/384,917 entitled "Evaluation of Augmented Reality Skins".

BACKGROUND

Unless otherwise indicated herein, the materials described in this section are not prior art to the claims in this application and are not admitted to be prior art by inclusion in this section.

Augmented reality may use the real world as a background and add a layer of augmented information. A sensor may capture real image information. A processor may change the captured real information by adding augmented information about the real world image. For example, an image of a real building may be displayed as an image of a Victorian era building.

SUMMARY

In an example, methods for generating augmented image data are generally described. The methods may include receiving, by a first device, first data from a second device. The first data may include data related to an image associated with the first device. The methods may include applying an augmented reality skin to the first data to generate second data. The second data may relate to an augmented image associated with the first device. The methods may include sending, by the first device, the second data to the second device.

In an example, a first device effective to generate augmented image data from image data received from a second device is generally described. The first device may include a memory that includes at least one augmented reality skin. The first device may further include a processor configured to be in communication with the memory. The processor may be configured to receive first data from the second device. The first data may include data related to an image associated with the first device. The processor may be configured to apply the augmented reality skin to the first data to generate second data. The second data may relate to an augmented image associated with the first device. The processor may be further configured to send the second data to the second device.

In an example, a system is generally described. The system may include a first device, a network, and a second device. The second device may be configured to be in communication with the first device over the network. The first device may include a first memory that includes at least one augmented reality skin. The first device may include a first processor configured to be in communication with the first memory. The first processor may be configured to receive first data from the second device. The first data may include data related to an image associated with the first device. The first processor may be configured to apply the augmented reality skin to the first data to generate second data. The second data may relate to an augmented image associated with the first device. The second device may include a second memory and a second processor configured to be in communication with the second memory. The second processor may be configured to send the first data to the first device. The second processor may be configured to receive the second data from the first device. The second processor may be further configured to display the augmented image.

In an example, methods for displaying augmented image data are generally described. The methods may include sending by a first device, first data to a second device. The first data may include data related to an image associated with the second device. The methods may further include receiving, by the first device, second data from the second device. The second data may relate to an augmented image associated with the second device. The methods may further include displaying, by the first device, the augmented image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 6 is a block diagram illustrating an example computing device that is arranged to implement a subject selected augmented reality skin, all arranged in accordance with at least some embodiments described herein.

DETAILED DESCRIPTION

Figure 1:
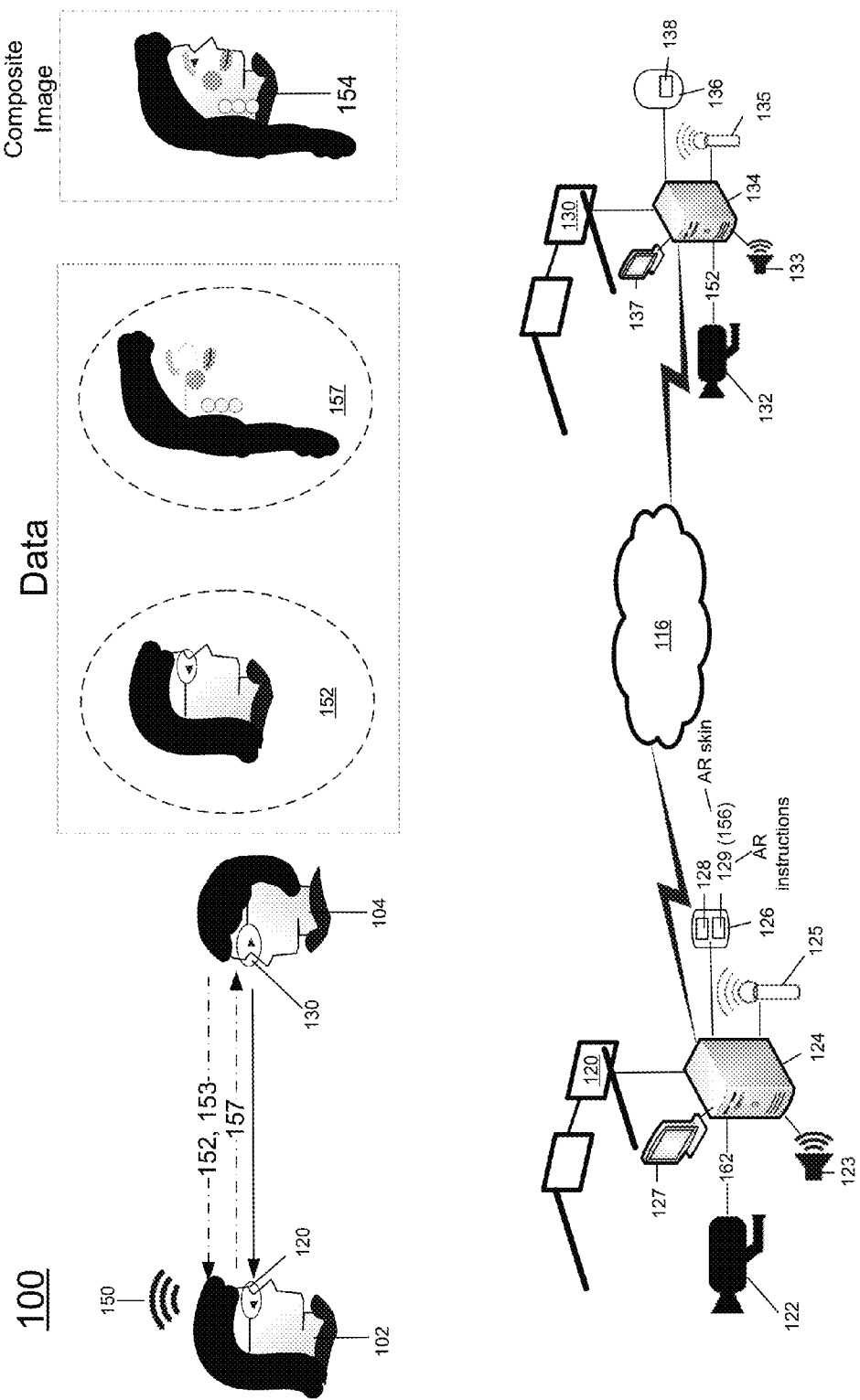
FIG. 1 illustrates an example system effective to implement a subject selected augmented reality skin.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to implementation of a subject selected augmented reality skin.

Briefly stated, technologies are generally described for systems, devices and methods effective to generate augmented image data. In some examples, a first device may receive first data from a second device. The first data may include data related to an image associated with the first device, such as an image of a user using the first device. The first device may apply an augmented reality skin to the first data to generate second data. The second data may relate to an augmented image associated with the first device. The first device may send the second data to the second device. The second device may then display the second data.

As described in more detail below, in an example, a first and second user may be using first and second augmented reality (AR) devices, respectively. The first AR device may transmit a signal to indicate a request by the first user to add an AR skin to images related to the first user. The second AR device may receive the signal and send data relating to images captured by the second AR device to the first AR device. The first AR device may apply an AR skin to the image data sent from the second AR device to produce augmented image data. The first AR device may send the augmented image data to the second AR device. The second AR device may display an image based on the received augmented image data.

FIG. 1 illustrates an example system 100 effective to implement a subject determined augmented reality skin, arranged in accordance with at least some embodiments described herein. As discussed in more detail below, in some examples, system 100 may include augmented reality (AR) devices 120 and 130 that may be used by users 102 and 104. In some examples, AR devices 120 and 130 may be augmented reality glasses like a mobile phone, portable computer, wearable device, GOOGLE GLASS. AR devices 120 and 130 may be configured to be in communication over a network 116. In some examples, network 116 may be, or include, a local area network and/or a wide area network, a Wi-Fi network and/or a BLUETOOTH network, etc.

To improve clarity of the discussion, in the figures, references to data are accompanied by a representation in the figure of an image produced if the corresponding data were rendered on a display. AR device 120 may include a camera 122, a speaker 123, a processor 124, a microphone 125, a memory 126, and/or a display 127. Camera 122 may produce image data 162. Display 127 may be a see-through display. Memory 126 may include instructions 128 and AR instructions 129. AR instructions 129 may include one or more AR skins 156 explained in more detail below. AR device 130 may include a camera 132, a speaker 133, a processor 134, a microphone 135, a memory 136, and/or a display 137. Camera 132 may produce image data 152. Display 137 may be a see-through display. Memory 136 may include instructions 138.

As discussed in more detail below, user 102 may desire to use AR device 120 to instruct AR device 130 to display augmented image data generated by AR device 120. As one example, the augmented image data generated by AR device 120 may correspond to an image of user 102. User 102 may, by processor 124 executing instructions 128, control AR device 120 to broadcast a signal 150 over network 116. In some examples, the broadcast may be a direct communication between AR device 120 and AR device 130. Signal 150 may indicate that AR device 120 wants to apply an AR skin to image data relating to user 102. Signal 150 may include information about AR device 120 and user 102.

AR device 130, including processor 134, may receive signal 150 over network 116. In an example, AR device 130 may generate a notification of signal 150. The notification may be an output that indicates that a request has been received for an AR skin be applied to image data relating to user 102. The notification may include text on display 127 or an audit alert through speaker 123.

In an example, user 104 may authorize AR device 130 to receive an AR skin applied to image data relating to user 102. User 104 may instruct AR device 130 to respond to signal 150. In another example, user 104 may have preset settings in AR device 130 to always receive an AR skin applied to image data relating to user 102.

In responding to signal 150, processor 134, by executing instructions 138, may send image data 152 to AR device 120. Image data 152 may include data from camera 132 relating to images captured by camera 132 of user 102 which could be displayed on display 137. AR device 130 may also send profile data 153 to AR device 120. Profile data 153 may include information about AR device 130 and user 104 including a profile of user 104.

AR device 120, including processor 124, may receive image data 152 and profile data 153 from AR device 130. Processor 124, by executing instructions 128, may analyze profile data 153 to select AR data 156 to apply to image data 152. Processor 124 may select a particular AR skin 156 from among one or more AR skins, to apply to image data 152 based on information in profile data 153. For example, processor 124 may analyze profile data 153 and determine that a profile of user 104 indicates that user 104 is a friend of user 102. In this example, processor 124 may apply a different AR skin 156 than when the profile of user 104 indicates that user 104 is not a friend of user 102.

In some examples, AR device 130 may not send profile data 153 to AR device 120. In these examples, image data 152 may include data sufficient to calculate a location of AR device 130. AR device 120, may analyze image data 152 to determine the location of AR device 130 and user 104. Processor 124 may determine the location of AR device 130 by analyzing image data 152 to identify data related to user 102. Processor 124 may determine the location of AR device 130 based on a perspective of an image of user 102 if image data 152 was displayed on a display. In another example, processor 124 may triangulate the location of AR device 130 and user 104 by analyzing image data 152 from camera 132 and image data 162 produced by camera 122. Processor 124 may compare perspectives of the same objects depicted in image data 152 and image data 162.

To further identify user 104, upon locating AR device 130 and user 104, processor 124 may analyze image data 162 for information related to user 104. Processor 124 may thereafter select AR skin 156 to apply to image data 152 based on the analysis. Processor 124 may execute facial recognition software in memory 126 on image data 162 related to user 104 to select AR skin 156 to apply to image data 152. For example, processor 124 may determine, by executing facial recognition software, that user 104 is the husband of user 102 and a different AR skin 156 may be applied to image data 152 than if processor 124 determined that user 104 is the mother of user 102. Facial recognition software may not identify individuals that are not known to user 102, but may still provide processor 124 with information to select an AR skin 156 to apply to image data 152. For example, a different AR skin 156 may be applied to image data 152 if user 104 is determined to be male than when user 104 is determined to be female. A default setting to select an AR skin 156 to apply to image data 152.

Upon selecting AR skin 156 to apply to image data 152, processor 124 may apply the AR skin 156 to image data 152. Each AR skin 156 in AR instructions 129 may include instructions and data specific to AR skin 156. Processor 124 may execute AR instructions 129 to apply AR skin 156 to image data 152. Processor 124, by executing AR instructions 129, may look for a feature in image data 152 such as a nose, head, ear, etc. Execution of AR instructions 129 may cause processor 124 to register the feature in image data 152 and change pixels in image data 152 based on AR instructions 129 to produce augmented image data 157. Augmented image data 157 may be data related to the application of AR skin 156 to image data 152 and may, when displayed along with image data 152 on display 137, create a composite image 154. In another example, augmented image data 157 may be displayed on see-through display 137 and create composite image 154 over user 102, when seen through see-through display 137. AR skin 156 may relate to an image of user 102. In other examples, AR skin 156 may relate to objects associated with user 102 such as a car, clothes, etc.

AR device 120 may transmit augmented image data 157 to AR device 130 over network 116. AR device 130 may receive augmented image data 157. Processor 134 in AR device 130 may render augmented image data 157 on display 137 to create composite image 154. AR device 130 may continually transmit image data 152 to AR device 120. AR device 120 may continually apply AR skin 156 to image data 152 and may continually transmit augmented image data 157 to AR device 130. AR device 130 may continually render augmented image data 157 on display 137 to continuously produce an augmented image 104. User 104 may continuously view composite image 154 on display 137.

Figure 2:
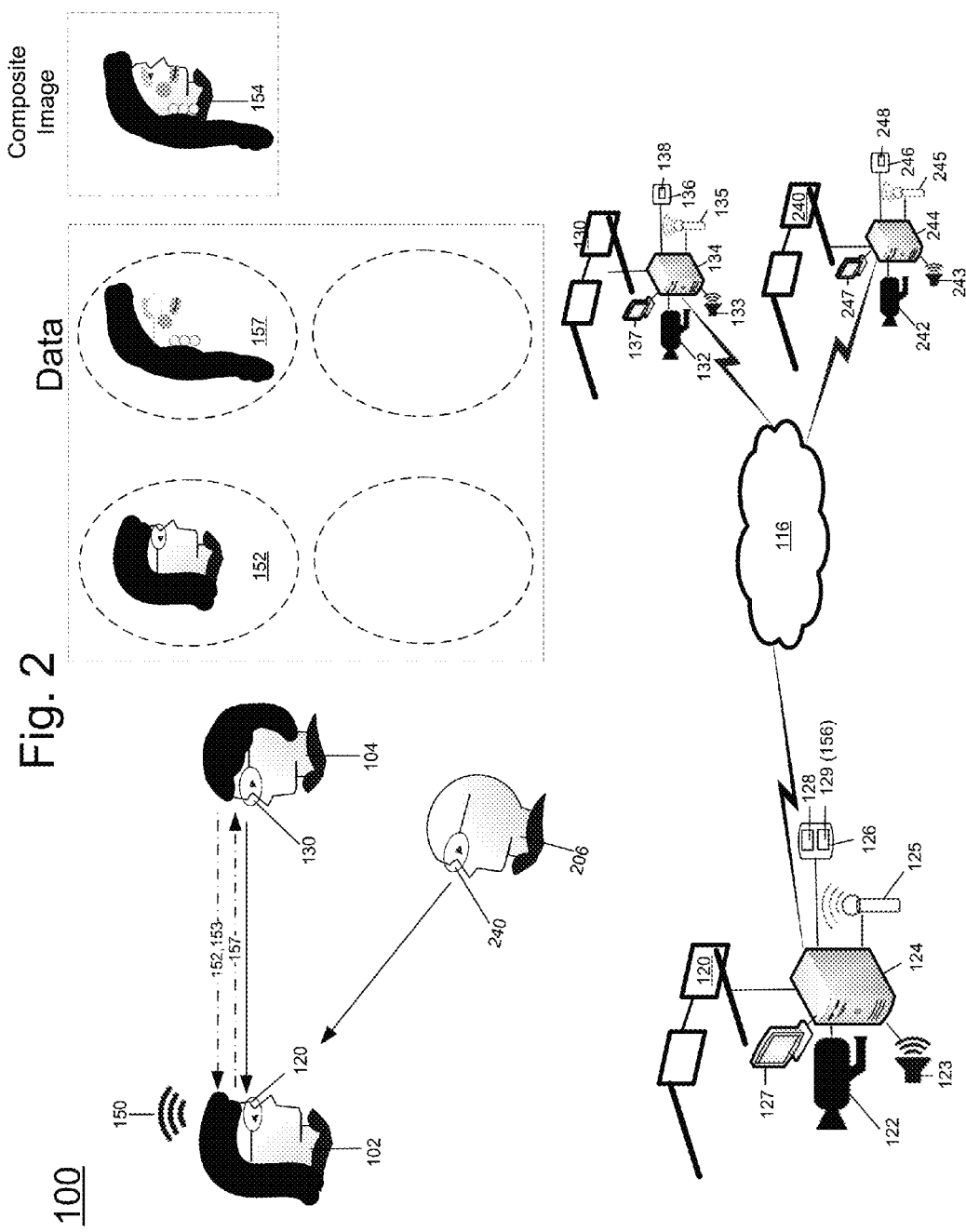
FIG. 2 illustrates the example system of FIG. 1 illustrating an example where the augmented reality skin is sent to a receptive device and to an unreceptive device.

FIG. 2 illustrates an example system 100 of FIG. 1 illustrating an example where the augmented reality skin is sent to a receptive device and an unreceptive device, arranged in accordance with at least some embodiments described herein. FIG. 2 is substantially similar to FIG. 1, with additional details. Those components in FIG. 2 that are labeled identically to components of FIG. 1 will not be described again for the purposes of clarity.

System 100 may also include an AR device 240 used by a user 206. AR device 240 may include a camera 242, a speaker 243, a processor 244, a microphone 245, a memory 246, and/or a display 247. Display 247 may be a see-through display. Memory 246 may include instructions 248.

User 102 may desire to use AR device 120 to instruct AR device 130 and AR device 240 to display augmented image data generated by AR device 120. The augmented image data generated by AR device 120 may correspond to an image of user 102. User 102 may, by processor 124 executing instructions 128, control AR device 120 to transmit signal 150 over network 116.

AR device 130, including processor 134, and AR device 240, including processor 234, may receive signal 150 over network 116. User 104 may authorize AR device 130 to receive an AR skin applied to data relating to user 102. User 104 may instruct AR device 130 to respond to signal 150. User 206 may not be receptive to receiving an AR skin applied to data relating to user 102. User 206 may instruct AR device 240 not to respond to AR device 120 in response to signal 150.

As discussed above, AR device 130 may send image data 152 to AR device 120. AR device 120 may select an AR skin 156 to apply to image data 152. Processor 124, in AR device 120, may register a feature in image data 152 and change pixels in image data 152 based on AR instructions 129 to produce augmented image data 157. AR device 120 may transmit augmented image data 157 to AR device 130 over network 116. AR device 130 may render augmented image data 157 on display 137. User 104 may view composite image 154 on display 137.

AR device 240, having not responded to signal 150, may not send data to AR device 120 and may not receive data from AR device 120. An empty dotted line oval in FIG. 2 is used to illustrate no response to signal 150 is sent from AR device 240. A second empty dotted line oval in FIG. 2 is used to illustrate no augmented image data sent from AR device 120 to AR device 240. User 206 may see user 102 without any composite image.

Figure 3:
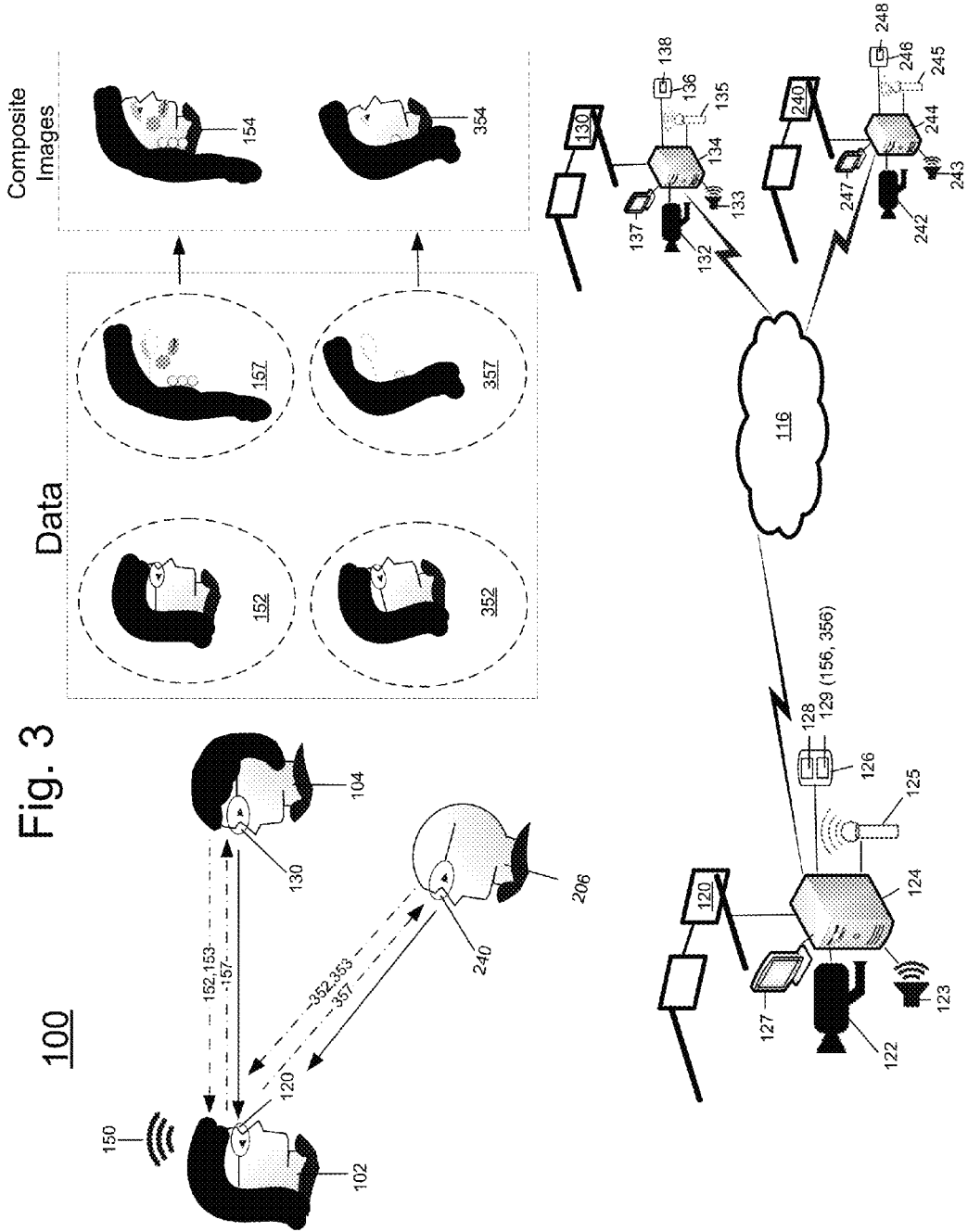
FIG. 3 illustrates the example system of FIG. 1 illustrating an example where augmented reality skins are sent to two different devices with two different user profiles.

FIG. 3 illustrates example system 100 illustrating an example where augmented reality skins are sent to two different devices with two different user profiles, arranged in accordance with at least some embodiments described herein. FIG. 3 is substantially similar to FIGS. 1 and 2, with additional details. Those components in FIG. 3 that are labeled identically to components of FIGS. 1 and 2 will not be described again for the purposes of clarity.

In the example, user 104 and user 206 may both authorize receipt of an AR skin applied to data relating to an image of user 102. User 104 may instruct AR device 130 to respond to signal 150. User 206 may instruct AR device 240 to respond to signal 150. AR device 130 may send image data 152 and profile data 153 to AR device 120. AR device 240 may send image data 352 and profile data 353 to AR device 120. Profile data 353 may include information about AR device 240 and user.

AR device 120 may select AR data 156 to apply to image data 152 by analyzing profile data 153. AR device 120 may select AR data 156 to apply to image data 352 by analyzing profile data 353. AR device 120 may select a different AR skin to apply to image data 152 than to apply to image data 352. For example, profile data 153 and profile data 353 may have different user profiles for user 104 and user 206 respectively. The user profile for user 104 may be friend and the user profile for user 206 may be parent. User 102 may want different AR skins applied to an image of user 102 for the different profiles. For example, as illustrated in FIG. 3, because profile data 153 indicates user 104 is a friend, processor 124 may select AR skin 156. AR skin 156 may augment image data 152 with long hair, large earrings, glasses removal, and eye, lip and face make-up. Because profile data 353 indicates user 206 as a parent, processor 124 may select AR skin 356. Applying AR skin 356 may augment image data 352 with medium length hair, small earrings, and glasses removal.

AR device 120 may transmit augmented image data 157 to AR device 130, and augmented image data 357 to AR device 240 over network 116. AR device 130 may receive augmented image data 157 and render augmented image data 157 on display 137. AR device 240 may receive augmented image data 357 and render augmented image data 357 on display 247. User 104 may view composite image 154 through display 137. User 206 may view a composite image 354 through display 247.

Among other potential benefits, a system in accordance with the disclosure may be able to allow a subject to select an AR skin to be applied to data relating to an image of the user for viewing by other users of AR devices. A user may further be able to select different AR skins to be applied for viewing by different AR device users. In an example, a user can send augmented make-up data to the AR device of a friend and augmented earring data to the AR device of a parent. A system in accordance with the disclosure may protect privacy as the augmented reality data communications are device to device and not broadcast communication.

Security may be maintained because the receiving device may receive data to be output and not a skin to be executed.

Figure 4:
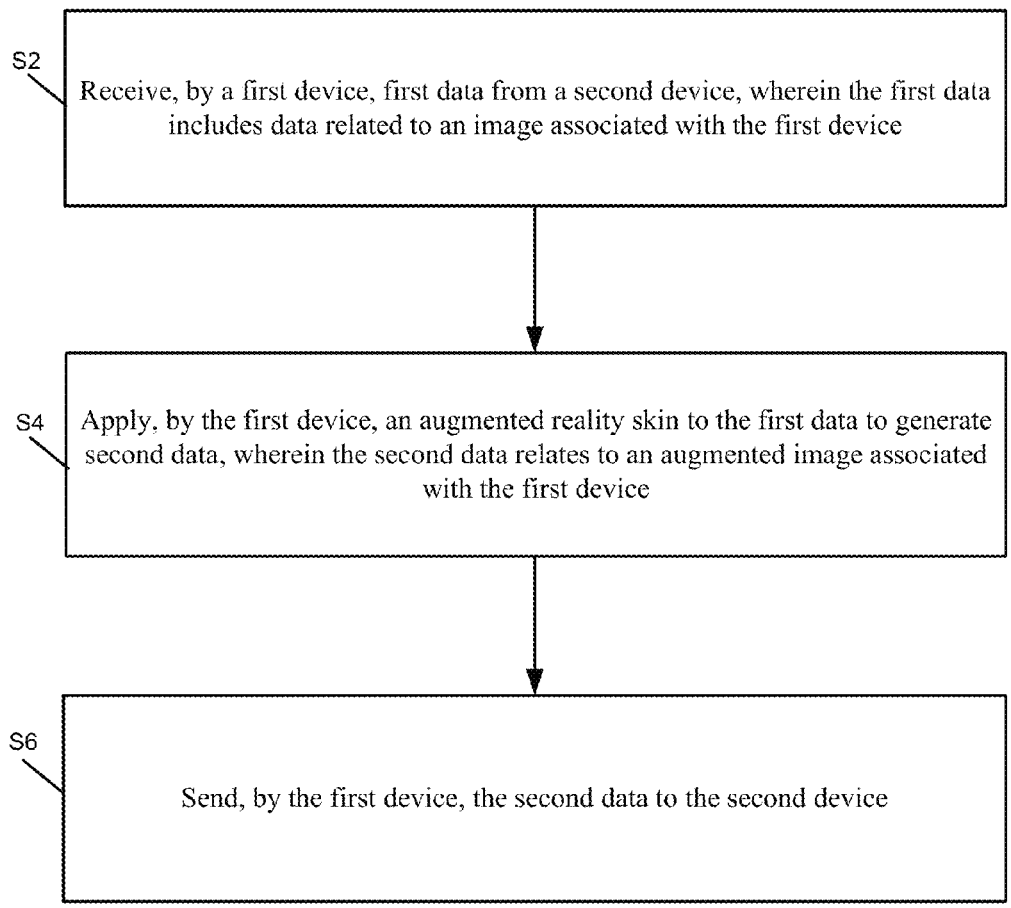
FIG. 4 depicts a flow diagram for example processes for implementing a subject selected augmented reality skin.

FIG. 4 depicts a flow diagram for example processes 400 for implementing a subject selected augmented reality skin, arranged in accordance with at least some embodiments described herein. The process in FIG. 4 could be implemented using, for example, system 100 discussed above. An example method for implementing a subject determined augmented reality skin may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation. Processing may begin at block S2.

At block S2, "Receive, by a first device, first data from a second device, wherein the first data includes data related to an image associated with the first device." The first device may receive first data from a second device. The first data may include data related to an image associated with the first device. The image may be of a user of the first device. The data may be sent to the first device from the second device in response to a request from the first device.

Processing may continue from block S2 to block S4, "Apply, by the first device, an augmented reality skin to the first data to generate second data, wherein the second data relates to an augmented image associated with the first device." The first device may apply an augmented reality skin to the first data to generate second data. The second data may relate to an augmented image associated with the first device. For example, first data may relate to an image of a user of the first device. Second data may relate to an image of the user of the first device with augmented long black hair.

Processing may continue from block S4 to block S6, "Send, by the first device, the second data to the second device." The first device may send the second data to the second device. The second device may render an image from the second data.

Figure 5:
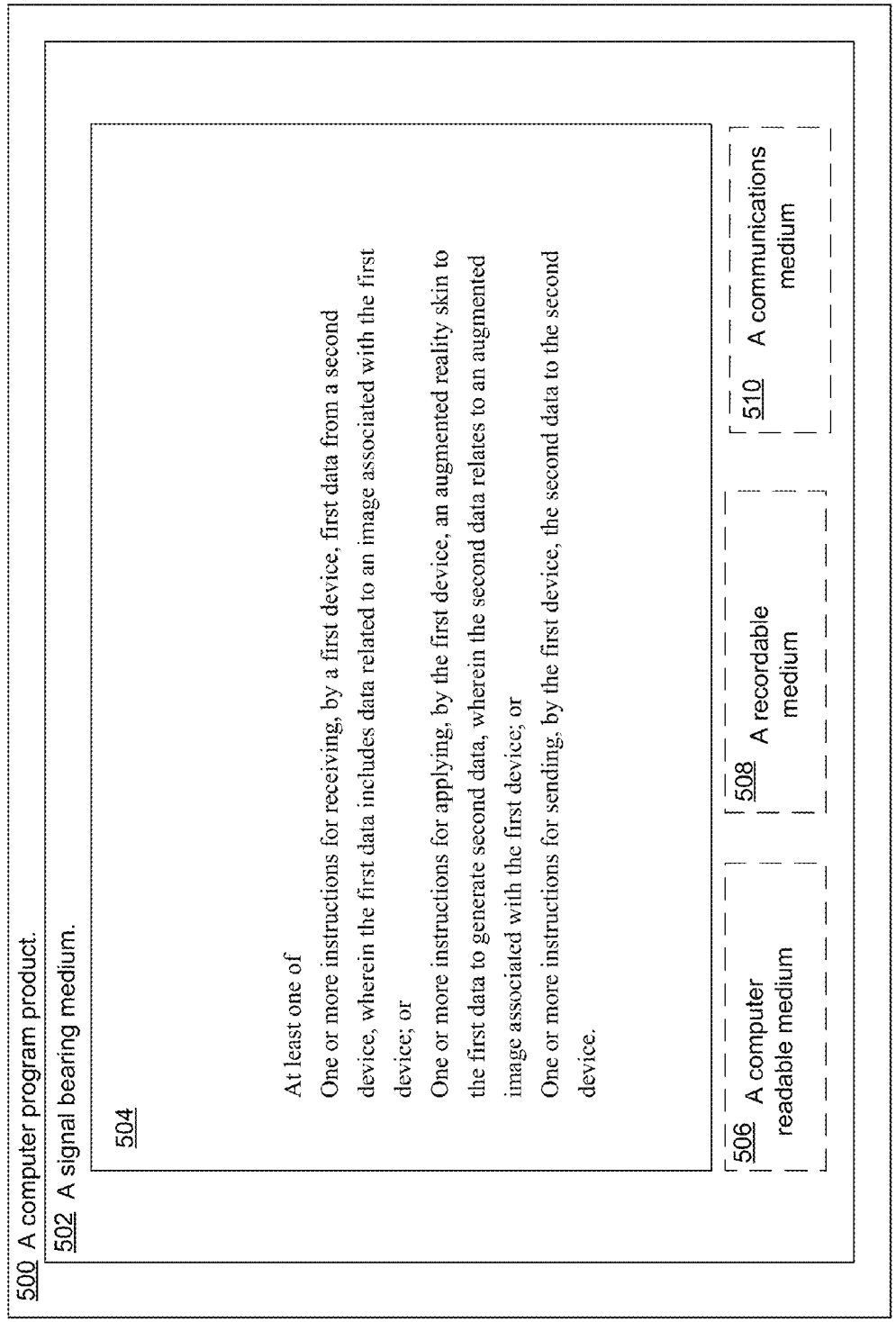
FIG. 5 illustrates computer program products effective to implement a subject selected augmented reality skin.

FIG. 5 illustrates computer program products 500 effective to implement a subject selected augmented reality skin, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4.

In some implementations, signal bearing medium 502 may encompass a computer-readable medium 506, such as, but not limited to, a hard disk drive (HDD), a compact disc (CD), a digital video disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communication medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

FIG. 6 is a block diagram illustrating an example computing device 600 that is arranged to implement a subject determined augmented reality skin arranged in accordance with at least some embodiments presented herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include a subject selected augmented reality skin algorithm 626 that is arranged to perform the functions as described herein including those described previously with respect to FIGS. 1-5. Program data 624 may include subject selected augmented reality skin data 628 that may be useful for subject selected augmented reality skin as is described herein. In some embodiments, application 622 may be arranged to operate with program data 624 on operating system 620 such that subject selected augmented reality skins may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CDs) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate augmented image data, the method comprising:
   broadcasting, by a user device, a signal that includes a request to receive first image data, wherein the request indicates that an augmented reality skin is to be applied on the first image data by the user device;
   in response to the signal being broadcasted, receiving, by the user device that includes a camera, the first image data from a camera of a receiving device, wherein the first image data includes a first image of a user associated with the user device that is to be displayed by the receiving device;
   modifying, by the user device, one or more pixel values in the first image data based on the augmented reality skin to obtain the augmented image data, wherein the augmented image data includes an augmented first image and excludes the augmented reality skin; and
   sending, by the user device, the augmented image data to the receiving device.

2. The method of claim 1, further comprising:
   receiving, by the receiving device, the augmented image data; and
   displaying the augmented first image on the receiving device.

3. The method of claim 1, further comprising, prior to modifying the one or more pixel values, selecting, by the user device, the augmented reality skin based on the first image data.

4. The method of claim 3, wherein:
   the first image data further includes data sufficient to calculate a location of the receiving device, and
   selecting is based on the location of the receiving device.

5. The method of claim 3, wherein selecting is further based on a profile of the receiving device.

6. The method of claim 3, wherein the augmented reality skin is a first augmented reality skin, the method further comprising:
   receiving by the user device, second image data from a friend device, wherein the second image data includes data related to a second image to be displayed by the friend device, wherein the second image is associated with the user device, and wherein the second image data is different from the first image data;
   selecting, by the user device and based on the second image data, a second augmented reality skin for the second image data;
   modifying, by the user device, one or more pixel values in the second image data based on the second augmented reality skin to obtain second augmented image data, wherein the second augmented image data includes a second augmented image and excludes the second augmented reality skin; and
   sending, by the user device, the second augmented image data to the friend device.

7. The method of claim 6, wherein the first augmented reality skin is the same as the second augmented reality skin.

8. The method of claim 6, wherein the first augmented reality skin is different from the second augmented reality skin.

9. A user device effective to generate augmented image data from image data received from a receiving device, the user device comprising:
   a camera;
   a memory that includes at least one augmented reality skin; and
   an augmented reality processor configured to be in communication with the memory, wherein the augmented reality processor is effective to:
      broadcast a signal that includes a request to receive first image data, wherein the request indicates that the at least one augmented reality skin is to be applied on the first image data by the user device;
      in response to the signal being broadcasted, receive the first image data from a camera of the receiving device, wherein the first image data includes data related to an image to be displayed by the receiving device, and wherein the first image data corresponds to an image of a user associated with the user device;
      modify one or more pixel values in the first image data based on the at least one augmented reality skin to obtain augmented image data, wherein the augmented image data excludes the augmented reality skin; and
      send the augmented image data to the receiving device.

10. The device of claim 9, wherein prior to modification of one or more pixel values in the first image data, the augmented reality processor is effective to select the at least one augmented reality skin based on the first image data.

11. The device of claim 10, wherein, the at least one augmented reality skin is a first augmented reality skin, the first image data is a first image, and the augmented image data is a first augmented image, and wherein the augmented reality processor is further effective to:
   receive second image data from a friend device, wherein the second image data includes data related to a second image to be displayed by the friend device, wherein the second image is associated with the user device, and wherein the second image data is different from the first image data;
   select, based on the second image data, a second augmented reality skin to apply to the second image data;
   modify one or more pixel values in the second image data based on the second augmented reality skin to obtain second augmented image data, wherein the second augmented image data excludes the second augmented reality skin; and
   send the second augmented image data to the friend device.

12. The device of claim 11, wherein the first augmented reality skin is the same as the second augmented reality skin.

13. The device of claim 11, wherein the first augmented reality skin is different from the second augmented reality skin.

14. A system, comprising:
   a user device;
   a network; and
   a receiving device configured to be in communication with the user device over the network, wherein the user device comprises:
  a camera;
  a first memory that includes at least one augmented reality skin;
  an augmented reality processor configured to be in communication with the first memory, wherein the augmented reality processor is effective to:
    broadcast a signal that includes a request to receive first image data, wherein the request indicates that the at least one augmented reality skin is to be applied on the first image data by the first user device;
    in response to the signal being broadcasted, receive the first image data from a camera of the receiving device, wherein the first image data includes data related to an image to be displayed by the receiving device, and wherein the first image data corresponds to an image of a user associated with the user device; and
    modify one or more pixel values in the first image data based on the at least one augmented reality skin to obtain augmented image data, wherein the augmented image data includes an augmented first image and excludes the at least one augmented reality skin, and
  wherein the receiving device comprises:
    a second memory; and
    a display processor configured to be in communication with the second memory, wherein the display processor is effective to:
      send the first image data to the user device;
      receive the augmented image data from the first user device; and
      display the augmented first image on the receiving device.

15. A method to display an augmented image, the method comprising:
  receiving, by a receiving device, a signal from a user device distinct from the receiving device, wherein the signal includes a request to send first image data, wherein the request indicates that an augmented reality skin is to be applied on the first image data by the user device;
  in response to the signal being received, sending, by the receiving device, the first image data captured by a camera of the receiving device, to the user device, wherein the first image data includes a first image of a user associated with the user device;
  receiving, by the receiving device, augmented image data from the user device, wherein the augmented image data is obtained by modification of one or more pixel values in the first image data based on the augmented reality skin, relates to an augmented first image and excludes the augmented reality skin; and
  displaying, by the receiving device, the augmented first image.

16. The method of claim 1, wherein the augmented reality skin includes associated instructions, and modifying the one or more pixel values in the first image data comprises executing the instructions.

17. The method of claim 1, wherein the first image data further includes identifying information of a second user associated with the receiving device, the method further comprising:
  prior to modifying the one or more pixel values, selecting, by the user device, the augmented reality skin based on the first image data, wherein
  a first augmented reality skin is selected if it is determined based on the identifying information that the second user is a friend of the first user, and
  a second augmented reality skin, different from the first augmented reality skin, is selected if it is determined that the second user is not a friend of the first user.

* * * * *

UNITED STATES PATENT AND TRADEMARK OFFICE
CERTIFICATE OF CORRECTION

PATENT NO.        : 10,192,359 B2
APPLICATION NO.   : 14/384887
DATED             : January 29, 2019
INVENTOR(S)       : Shmuel Ur Page 1 of 1

It is certified that error appears in the above-identified patent and that said Letters Patent is hereby corrected as shown below:

In the Specification

Column 4, Line 22, delete "AR data 156" and insert --AR skin 156--, therefor.

Signed and Sealed this
Twentieth Day of August, 2019

Andrei Iancu
*Director of the United States Patent and Trademark Office*